United States Patent [19]
Affeldt et al.

[11] 3,903,035
[45] Sept. 2, 1975

[54] POLYMERIC PAPER COATING COMPOSITION

[75] Inventors: Hans Affeldt, Bad Vilbel; Manfred Kriewen, Goslar; Guenter Rinck, Frankfurt am Main; Klaus-Gerhard Steinfort, Falkenstein; Helmut Unruh, Bergen-Enkheim; Wolfgang Wirths, Frankfurt am Main, all of Germany

[73] Assignee: Synthomer Chemie GmbH, Frankfurt, Germany

[22] Filed: Oct. 17, 1973

[21] Appl. No.: 407,333

[30] Foreign Application Priority Data
Oct. 18, 1972 Germany............................ 2250977

[52] U.S. Cl...260/29.7 D; 117/155 UA; 260/29.7 H; 260/29.7 W; 260/892; 260/894
[51] Int. Cl....... C08d 7/00; C08d 9/02; C08d 9/08
[58] Field of Search.... 260/29.7 W, 29.7 D, 29.7 H, 260/892, 894; 117/155 UA

[56] References Cited
UNITED STATES PATENTS
3,694,394  9/1972  Freeman ...................... 260/29.7 W Primary Examiner—Morris Liebman
Assistant Examiner—T. DeBenedictis, Sr.

[57] ABSTRACT

Pigmented paper coating compositions comprising a mixture of alkali-soluble and alkali-insoluble polymer latices have greatly improved water retention properties when an emulsion copolymer of butadiene, 20–55% wt. methacrylic acid and 3–35% wt. half ester of a polymerizable dicarboxylic acid and ethoxylated alcohol or alkylphenol is used as the alkali-soluble polymer component.

4 Claims, No Drawings

POLYMERIC PAPER COATING COMPOSITION

TECHNICAL BACKGROUND AND PRIOR ART

The present invention relates to aqueous pigmented coating agents based upon mixtures of an alkali-soluble and alkali-insoluble latex for the coating of plane substrates on a cellulose base, such as paper. In particular the invention concerns the provision of a coating agent of the above-mentioned type containing an alkali-soluble latex of a copolymer of butadiene, methacrylic acid and the half ester of maleic acid and ethoxylated alcohol.

It is known to provide for the coating of fibrous substrates, such as paper or cardboard, aqueous pigmented coating agents which utilize pigment binders which are free of starch and casein and which consist of a mixture of 5 to 20% alkali-soluble butadiene-polymer latex and 80 to 95% alkali-insoluble polymer- or copolymer latex (U.S. Pat. No. 3,513,121). Related latex pigment binder systems are also disclosed in British Pat. No. 1,262,460 which are comprised of a mixture of 5 to 20% of a butadiene copolymer latex having limited alkali solubility but which is swellable therein and 80 to 95% of alkali-insoluble copolymer latex. Such coating materials are economical to produce, but they do not attain in all cases the high water retention power of coating materials based upon starch or casein.

In U.S. Pat. No. 3,657,175 to Zimmerman, butadiene copolymer latices are disclosed which consist of 20 to 55% methacrylic acid, 3 to 35% of ethylene-unsaturated carboxylic acid and ethoxylated alcohol, the balance at least 35% styrene and/or butadiene, and which have been suggested as thickening, stabilizing and dispersing agents, for example, for textile coatings, printing inks, and pigment pastes. The viscosity increase of latex-containing materials described there for the purpose, among others to improve spreadability, illustrates in a wholly different context controlled thickening as it may be useful, for example, for coating paper, depending on the type of the coating unit, to achieve a desired coating weight.

In addition to the viscosity of a paper coating compound, its water retention power is very important. As soon as an aqueous coating compound comes in contact with the porous fibrous substrate, liquid is withdrawn from the coating compound by the substrate, which leads to an uncontrolled increase of the dry substance content, and thus to an uncontrolled viscosity increase. This withdrawal of liquid can go so far that the coating compound is no longer fluid, but crumbly. In this condition the applied coating agents can no longer be smoothed as usual. In order to keep the harmful process of an uncontrolled and undesired viscosity increase of the coating agent in contact with the substrate resulting from liquid withdrawal within tolerable limits, the coating compound must offer a certain resistance to this liquid withdrawal. It must have a certain minimum water retention power to be processable at all.

This required resistance against excessive withdrawal of liquid from the coating agent is different from the resistance against a movement of the individual particles of the coating agent relative to each other, which would correspond to a thickening of the coating agent.

DESCRIPTION OF THE INVENTION

The invention is therefore directed to the problem of providing coating compounds for plane substrates on a cellulose base having improved water retention power. To this end the invention starts from hydrous, pigmented coating compounds which contain latex mixtures of 5 to 20% alkali-soluble butadiene copolymer latex and 80 to 95% alkali-insoluble latex from a copolymer of 40 to 65%, preferably 50 to 60%, by weight methacrylic acid and 5 to 15%, preferably 8 to 12%, by weight monoester of unsaturated dicarboxylic acid and ethoxylated fatty alcohol or ethoxylated alkyl phenol with a degree of ethoxylation of 10 to 30, the balance of the polymer consisting of at least 30% by weight of butadiene. It was found that the special alkali-soluble butadiene copolymer latex in combination with the usual alkali-insoluble copolymer latex imparts to pigmented coating compounds for coating plane substrates on a cellulose base, particularly paper and cardboard, a remarkably high water retention power without thickening the coating agent beyond the necessary minimum. By this means, the additional use of natural water-soluble binders, such as casein or starch is not necessary.

This finding was surprising, because the alkali-soluble copolymers to be used according to the invention were known merely as thickeners and corresponded to other conventional thickeners in coating agents, as they are used for coating carpet backs. But unlike conventional polymeric thickeners based upon copolymers of acrylic acid and their homologs, they impart to pigmented coating agents of latex mixtures of alkali-soluble and alkali-insoluble latex a water retention power which is capable of trouble-free processing without thickening the coating agent beyond the necessary extent.

This difference in the behavior of the alkali-soluble polymers to be used according to the invention is due to the action of the polymerized monoester of an ethylenically unsaturated carboxylic acid and ethoxylated alcohol. The monoester portion of the alkali-soluble polymer has a great effect on the water retention power imparted to the coating agent. The portion of the monoester in the copolymer should be between 5 and 15% by weight, preferably between 8 and 12% by weight. As an acid-component of the monoester are used unsaturated dicarboxylic acids, particularly maleic acid or itaconic acid of which maleic acid is preferred for economical reasons. The alcohol component of the monoester is formed of ethoxylated alcohol.

Suitable alcohols are known ethoxylated aliphatic fatty alcohols or ethoxylated alkyl-substituted phenols, e.g. dodecyl (polyethylenoxy)-ethanol, octadecyl-(polyethylenoxy)-ethanol, n-octylphenoxy-(polyethylenoxy)-ethanol, n-nonylphenoxy-(polyethylenoxy-ethanol, n-dodecylphenoxy (polyethylenoxy)-ethanol, triisobutyl-phenoxy-(polyethylenoxy)-ethanol. The ethoxylated alcohol should have a degree of ethoxylation corresponding to from about 10 to 30 moles ethylene oxide (EO) per mole alcohol.

In addition to at least 30% by weight butadiene, the alkali-soluble copolymer to be used according to the invention contains as a third monomer methacrylic acid in an amount of 40 to 65%, preferably 50 to 60%, and particularly 55% by weight. The preparation of the above-described alkali-soluble polymers is described in U.S. Pat. No. 3,657,175 to Zimmerman.

The alkali-soluble copolymer latices of the coating compound according to the invention, are prepared by emulsion-polymerization in an acid aqueous medium, and are therefore compatible in the form of their acid dispersion with most conventional alkali-insoluble polymer dispersions used as a binder for coating paper and cardboard, if these alkali-insoluble polymer latices are stable at pH-values below about pH 5 and do not coagulate. Suitable for example, are alkali-insoluble copolymer latices, like dispersions of copolymers of styrene and butadiene with, if necessary, unsaturated carboxylic acids, like acrylic acid, fumaric acid, or itaconic acid, or copolymers of acrylic esters with other vinyl compounds, like styrene. Preferably latices of copolymers of 43 to 65% styrene, 35 to 56% butadiene and 1 to 5% unsaturated carboxylic acids are used as alkali-insoluble latex in the coating compound according to the invention.

Particularly suitable coating compounds with a high water retention power contain in the latex mixture (A) an alkali-soluble latex of a copolymer of 40 to 65% preferably 50 to 60%, methacrylic acid, and 5 to 15, preferably 8 to 12%, monoester of maleic acid and nonylphenoxy-(polyethylenoxy)-ethanol with a degree of ethoxylation of 10 to 30, the balance consisting of at least 30% butadiene and (B) an alkali-insoluble latex of a copolymer of 43 to 65% styrene, 35 to 56% butadiene and 1 to 5% acrylic acid, fumaric acid or itaconic acid.

The mixtures of alkali-insoluble and alkali-soluble latex are stable in storage and form low-viscosity latex mixtures which are highly suitable for the preparation of pigmented coating agents since they can be added directly to a corresponding pigment dispersion. By adding alkali, the full effectiveness of the alkali-reactive polymer in the mixture is achieved.

Depending on the use of the coated fibrous substrates, e.g. papers, coating compounds with different amounts of binders are used. It is necessary to adapt the portion of alkali-soluble copolymer latex in the latex mixture to the respective requirements so that a sufficient water retention power of the coating compound with low binder portions is achieved and an undesired high viscosity with high binder portions is avoided. Within the range of 5 to 20% by weight alkali-soluble latex in the latex mixture of alkali-soluble and alkali-insoluble latex, it is advisable to provide for coating compounds with a high binder portion about 6% by weight alkali-soluble polymer. For coating compounds with a low binder portion about 15% by weight alkali-soluble polymer in the latex mixture should be used.

By coating compounds with a "low" binder portion is meant those with about 4 to 8% binder, related to the pigment, while coating compounds with a "high" binder portion contain about 10 to 18% binder.

For the production of the pigmented coating compounds are used as pigments the finely dispersed white pigments customary in paper coating, such as kaolin, titanium dioxide, calcium carbonate in precipitated or ground form, and precipitated barium sulfate. The advantages of the coating compound according to the invention are that they have an unusually high water retention power with a particularly favorable viscosity for processing. Moreover, these favorable properties are achieved without the use of natural binders such as casein or starch.

The invention will now be described more fully in the following examples.

EXAMPLE 1

46.20 kg nonylphenoxy-(polyethylenoxy)-ethanol (30 EO) were melted in a heatable vessel at about 70°C, then 2.5 g hydroquinone were added first as an inhibitor and then 2.94 kg maleic anhydride in small portions. The temperature was between 60° and 65°C and after a few hours the reaction to the half ester of the maleic acid was complete.

For the production of the alkali-soluble butadiene copolymer 350 liter water are charged into an enameled 800 liter reactor and 20 kg of the above-described maleic half ester were added under stirring. The reactor was then charged with a chelate-former, emulsifier and stabilizer, then 110 kg metacrylic acid and the initiator were added. After purging the reactor with inert gas, 70 kg butadiene were pumped in and the contents of the reactor was polymerized between 55° and 65°C in about 8 hours to over 90% conversion.

By distilling off volatile residual monomers and water, the resulting dispersion was concentrated to about 40% dry substance content (DS-content).

EXAMPLE 2

To separate portions of 90 parts by weight dry substance (DS) of an alkali-insoluble carboxyl groups-containing copolymer latex of 55% by weight styrene, 42% by weight butadiene and 3% by weight itaconic acid with a pH-value of about 4 were added the following copolymer latices (10 parts by weight dry substance):

1. The alkali-soluble polymer produced according to example 1 with polymerized maleic half ester (latex mixture I)
2. An alkali-soluble copolymer of 45% by weight butadiene and 55% by weight methacrylic acid (latex mixture II).

The latex mixtures I and II obtained were standardized to a DS-content of 48%. Both latex mixtures were stable in storage.

To 357 g of a coating kaolin dispersion (clay ultra white 90 by Engelhard Minerals USA) with 70% DS-content were added first 50 g water and then 42 g of latex mixture I. With a total amount of 42 g 3% soda lye and water, the pH-value was standardized to pH 9.0 and the DS-content to about 55% (coating agent I).

In a similar manner we prepared a coating agent II with latex mixture II, likewise with about 55% DS-content and pH 9.0. Viscosity and water retention power of the two coating agents were compared. The viscosity was determined with a viscosimeter of the Searle type (Rotovisko by Gebr. Haake), the water retention power was measured on the basis of a filter paper according to the principle which is known in the paper industry as the S. D. Warren test [see e.g. TAPPI, 41 (2), 77 (1958) as well as TAPPI 53 (2), 216 (1970)].

The following values show that with comparable viscosity the water retention power of the coating agent of the invention (I) is clearly superior to that of coating agent II.

TABLE 1

| Comparison of Viscosity and Water Retention | | |
|---|---|---|
| Coating Agent | I | II |

Viscosity, centipoises at

TABLE 1-Continued

Comparison of Viscosity and Water Retention

| Coating Agent | | I | II |
|---|---|---|---|
| Shearing Gradient | 7.05 sec⁻¹ | 2,700 | 2,500 |
| " | 63.4 sec⁻¹ | 600 | 570 |
| " | 1,142 sec⁻¹ | 181 | 167 |
| Water Retention Time, Seconds | | 50.3±2.9 | 27.4±1.9 |

EXAMPLE 3

A coating agent which contained per 100 parts by weight pigment (clay ultra white 90) 6 parts by weight (related to the dry substance) of the latex mixture I described in example 2, could be processed without any difficulties on a smooth-scraping machine with a DS-content of 60% without any addition of natural water-soluble binders like casein or starch. The coated paper showed no doctor streaks which are characteristic of coating agents having insufficient water retention power.

What is claimed is:

1. An aqueous coating composition comprising a blend of polymeric latices prepared by aqueous emulsion polymerization, said blend containing:
   A. From about 80 to about 95% by wt., basis dry copolymer solids of an alkali-insoluble latex of a copolymer of 35–56% wt. butadiene, 43–65% wt. styrene and 1–5% wt. of an ethylenically unsaturated carboxylic acid; and
   B. From about 20 to about 5% by wt., basis dry copolymer solids, of an alkali-soluble latex of a copolymer of 20–55% wt. butadiene, 40–65% wt. methacrylic acid and 5–15% wt. monoester of an ethylenically unsaturated dicarboxylic acid and an ethoxylated fatty alcohol or ethoxylated alkyl phenol having a degree of ethoxylation of 3 to 20 moles per mole of fatty alcohol or alkyl phenol.

2. The composition of claim 1 in which the dicarboxylic acid component of the monoester monomer contained in the alkali-soluble latex is selected from the group consisting of maleic acid and itaconic acid.

3. The composition of claim 1 in which the alkali-soluble latex is a copolymer of 28–47% wt. butadiene, 50–60% wt. methacrylic acid and 8–12% wt. monoester of an ethylenically unsaturated dicarboxylic acid and an ethoxylated fatty alcohol or ethoxylated alkyl phenol having a degree of ethoxylation of 3 to 20 moles per mole of fatty alcohol or alkyl phenol.

4. A permeable cellulosic substrate having a coating on at least one side which comprises a mixture of pigment or filler with deposited polymeric solids derived from a blend of polymeric latices containing:
   A. From about 80 to about 95% by wt., basis dry copolymer solids of an alkali-insoluble latex of a copolymer of 35–56% wt. butadiene, 43–65% wt. styrene and 1–5% wt. of an ethylenically unsaturated carboxylic acid; and
   B. From about 20 to about 5% by wt., basis dry copolymer solids, of an alkali-soluble latex of a copolymer of 20–55% wt. butadiene, 40–65% wt. methacrylic acid and 5–15% wt. monoester of an ethylenically unsaturated dicarboxylic acid and an ethoxylated fatty alcohol or ethoxylated alkyl phenol having a degree of ethoxylation of 3 to 20 moles per mole of fatty alcohol or alkyl phenol, the coating having been formed by removal of water from an aqueous alkaline dispersion of the mixture deposited on the substrate.

* * * * *